United States Patent
Heidester

(10) Patent No.: US 10,926,665 B2
(45) Date of Patent: Feb. 23, 2021

(54) METHOD FOR CONTROLLING A SEATING APPARATUS OF A MOTOR VEHICLE WHEN OPERATING A VIRTUAL REALITY APPLICATION AND SEATING APPARATUS

(71) Applicant: AUDI AG, Ingolstadt (DE)

(72) Inventor: Wolfgang Heidester, Abensberg (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/645,076

(22) PCT Filed: Jul. 12, 2018

(86) PCT No.: PCT/EP2018/068885
§ 371 (c)(1),
(2) Date: Mar. 6, 2020

(87) PCT Pub. No.: WO2019/063157
PCT Pub. Date: Apr. 9, 2019

(65) Prior Publication Data
US 2020/0282864 A1    Sep. 10, 2020

(30) Foreign Application Priority Data

Sep. 28, 2017 (DE) ............... 10 2017 009 090.4

(51) Int. Cl.
*B60N 2/02* (2006.01)
*B60N 2/90* (2018.01)
(Continued)

(52) U.S. Cl.
CPC .......... *B60N 2/0232* (2013.01); *A63G 31/16* (2013.01); *B60N 2/02* (2013.01); *B60N 2/0244* (2013.01);
(Continued)

(58) Field of Classification Search
CPC .......... B60N 2/0244; B60N 2/02; B60N 2/90; B60N 2/42; B60N 2002/0204;
(Continued)

(56) References Cited

U.S. PATENT DOCUMENTS 9,821,920 B2 * 11/2017 Cole et al. .............. G06F 3/012
10,279,925 B2 * 5/2019 Cole et al. .............. G06F 3/012
(Continued)

FOREIGN PATENT DOCUMENTS

DE          101 56 219 C1    8/2003
DE     10 2009 060 213 A1    6/2011
(Continued)

OTHER PUBLICATIONS

English-language translation of the International Preliminary Report on Patentability and Written Opinion dated Mar. 31, 2020 in corresponding International Application No. PCT/EP2018/068885.
(Continued)

*Primary Examiner* — Dale W Hilgendorf
(74) *Attorney, Agent, or Firm* — Maier & Maier, PLLC

(57) ABSTRACT

A method for operating a seating apparatus of a motor vehicle during operation of a virtual reality application by a user located in the motor vehicle, wherein the seating apparatus comprises at least one seating unit, at least one drive for moving the seating unit, and at least one control device, which is functionally assignable or assigned a sensor unit of the motor vehicle, and wherein the seating apparatus is connected to the virtual reality application, which comprises at least one processing unit.

20 Claims, 1 Drawing Sheet

(51) Int. Cl.
*A63G 31/16* (2006.01)
*B60N 2/42* (2006.01)
*G01S 19/42* (2010.01)
*G01S 19/52* (2010.01)

(52) U.S. Cl.
CPC ............. *B60N 2/42* (2013.01); *B60N 2/90* (2018.02); *G01S 19/421* (2013.01); *G01S 19/52* (2013.01); *B60N 2002/0204* (2013.01); *B60N 2002/0268* (2013.01)

(58) Field of Classification Search
CPC . B60N 2002/0268; A63G 31/16; G01S 19/52; G01S 19/421
See application file for complete search history.

(56) References Cited

U.S. PATENT DOCUMENTS

| | | | |
|---|---|---|---|
| 10,589,625 B1* | 3/2020 | Goslin | .......... B60K 35/00 |
| 2014/0220545 A1 | 8/2014 | Sangermano, II et al. | |
| 2017/0103571 A1* | 4/2017 | Beaurepaire | ............ G06F 3/011 |
| 2017/0136842 A1* | 5/2017 | Anderson et al. | ... B60N 2/0244 |
| 2017/0253252 A1* | 9/2017 | Donnelly et al. | .... B60N 2/0232 |
| 2020/0062240 A1* | 2/2020 | Marzorati et al. | ... B60N 2/0244 |

FOREIGN PATENT DOCUMENTS

| | | |
|---|---|---|
| DE | 20 2012 009 352 U1 | 11/2012 |
| DE | 10 2014 011 278 A1 | 1/2015 |
| DE | 10 2014 019 579 A1 | 6/2016 |
| WO | 2016197068 A1 | 12/2016 |

OTHER PUBLICATIONS

Examination Report dated Jun. 7, 2018 in corresponding German application No. 10 2017 009 090.4; 8 pages including Machine-generated English-language translation.

International Search Report and Written Opinion of the International Searching Authority dated Oct. 25, 2018 in corresponding International application No. PCT/EP2018/068885; 26 pages including Machine-generated English- language translation.

* cited by examiner

METHOD FOR CONTROLLING A SEATING APPARATUS OF A MOTOR VEHICLE WHEN OPERATING A VIRTUAL REALITY APPLICATION AND SEATING APPARATUS

FIELD

The disclosure relates to a method for operating a seating apparatus of a motor vehicle when operating a virtual reality application and also a seating apparatus which is operable by such a method.

BACKGROUND

Pivotable seating apparatuses for use inside motor vehicles which are coupled to driving-dynamics sensors are known from the prior art.

In this case, the seating apparatuses are actuated and moved according to the forces acting on a vehicle occupant in such a way that the forces acting on the vehicle occupant can be reduced.

In particular with respect to the autonomous driving of motor vehicles, i.e., the independent movement of the motor vehicle, without intervention of the vehicle occupant, it is made possible for the vehicle occupant to pursue work activities or leisure activities during transport. In this case, so-called virtual reality applications are known both in the field of work activities and also leisure activities in which a user puts on a pair of spectacles or the like, for example, which comprises a display element like a display screen and displays a virtual space to the user.

SUMMARY

It has proven to be disadvantageous in the application of virtual reality applications that acceleration forces, centrifugal forces, and gravity forces act on the vehicle occupant and/or on the user of the virtual reality application during transport within a motor vehicle which are perceived by the human sense of balance and trigger motion sickness in the vehicle occupant and/or the user.

One aim of an exemplary embodiment of the invention is to propose a method for controlling a seating apparatus of a motor vehicle when operating a virtual reality application and also a seating apparatus in which the risk of the occurrence of motion sickness is reduced.

This aim is achieved by a method for operating a seating apparatus of a motor vehicle during operation of a virtual reality application by a user located in the motor vehicle, wherein the seating apparatus comprises at least one seating unit, at least one drive for moving the seating unit, and at least one control device, which is functionally assignable or is functionally assigned a sensor unit of the motor vehicle, and wherein the seating apparatus is connected to the virtual reality application, which comprises at least one processing unit, having the following steps:

a. acquiring at least one real ACTUAL value of at least one movement or acceleration of the motor vehicle by way of the sensor unit functionally assigned to the control device and relaying the real ACTUAL value of the movement or acceleration of the motor vehicle to the control device;

b. acquiring and/or computing a simulated virtual ACTUAL value of at least one movement or acceleration within the virtual reality application by way of the processing unit and relaying the virtual ACTUAL value of the movement or acceleration within the virtual reality application to the control device;

c. computing a real TARGET value of a correction movement or correction acceleration by the seating unit according to the real ACTUAL value of the movement or acceleration of the motor vehicle in such a way that the superposition of correction movement or correction acceleration by the seating unit and movement or acceleration of the motor vehicle corresponds substantially in magnitude and direction to the virtual ACTUAL value of the movement or acceleration within the virtual reality application;

d. actuating the drive of the seating unit by way of the control device according to at least the TARGET value to execute the correction movement or correction acceleration by way of the seating unit.

The real ACTUAL value of the movement of the motor vehicle can comprise both magnitude and direction of the movement of the motor vehicle. This applies accordingly to the virtual ACTUAL value of the movement within the virtual reality application.

By way of the correction movement, the acceleration forces of the motor vehicle acting on the vehicle occupant are used or compensated for the virtual reality application.

If, for example, a movement is simulated within the virtual reality application, the acceleration forces acting on the motor vehicle are at least partially used for the virtual reality application and supplemented by the correction movement of the seating unit in magnitude and direction in such a way that real acceleration forces act on the vehicle occupant and/or the user which correspond to the simulated ACTUAL movement within the virtual reality application. In this way, the sense of balance of the real movement and acceleration acting on the user and the simulated movement or acceleration, respectively, correspond.

If the vehicle occupant and/or the user does not simulate a movement within the virtual reality application, the movements or acceleration forces acting on the vehicle occupant can be compensated for by the correction movement so that the vehicle occupant and/or the user does not perceive a movement due to their sense of balance.

It has proven to be advantageous if the at least one real ACTUAL value of the movement or acceleration of the motor vehicle is acquired by the sensor unit functionally assigned to the control device by means of a first sensor means of the sensor unit, such as a movement or acceleration sensor and/or a gyroscope.

In this way, the movement of the motor vehicle and the acceleration forces acting on the vehicle occupant can be acquired and determined in a simple manner.

In principle, it is conceivable that the method determines a location and orientation of the virtual reality application on the basis of the location and alignment of the seating unit. The quality of the method may be further increased if the method comprises the step of acquiring the location and the orientation of the virtual reality application, in particular a virtual viewing direction, by way of a second sensor means of the sensor unit and/or the virtual reality application, such as a movement or acceleration sensor, an acceleration sensor, a compass, and/or a gyroscope.

In such a way, the virtual reality application is decoupled from the seating unit, in particular the location and orientation of the seating unit.

It has proven to be advantageous if the acquisition of the at least one real ACTUAL value of the movement or acceleration of the motor vehicle comprises an acquisition of the location, orientation and movement and/or acceleration direction of the motor vehicle by means of a navigation means, such as Global Positioning System, compass or radar, which can be relayed to the control device.

The processing unit and the control device, in principle, can be coupled in any desired manner. It has proven to be advantageous if the virtual ACTUAL value of the movement or acceleration within the virtual reality application is relayed to the control device by means of a cable connection between the processing unit and the control device and/or wirelessly, in particular via radio.

The compensation movement can, in principle, take place in any desired manner. To make it possible for the sense of balance to experience a realistic simulation of the acceleration forces, it has proven to be advantageous if the correction movement or correction acceleration by the seating unit comprises a rotation about a vertical, transverse and/or longitudinal axis of the motor vehicle and/or if the correction movement or acceleration by the seating unit comprises a movement of the seating unit along the vertical, transverse and/or longitudinal axis of the motor vehicle.

The seating unit is freely movable inside the motor vehicle due to the ability of the seating unit to rotate about the vertical, transverse and/or longitudinal axis of the motor vehicle. For example, it is conceivable that the seating unit is gimbal-mounted.

If the seating unit is movable in the vertical axis, in transverse axis and/or along the longitudinal axis, the seating unit is movable within the vehicle and irregularities during the movement of the motor vehicle, for example, due to bumps, can be compensated for.

In addition, it has proven to be advantageous in one embodiment of the method if the method comprises the step of transferring the seating unit into a location and orientation in which the viewing direction of the virtual reality application corresponds to the movement direction of the motor vehicle.

Finally, according to one embodiment of the method, said method comprises the step of actuating the virtual reality application by at least one input means, in particular to simulate a virtual movement or acceleration within the virtual reality application. For this purpose, the input means can comprise, for example, a joystick or the like. Furthermore, it is conceivable that in the case of an autonomous movement of the motor vehicle, the steering wheel provided in the motor vehicle and also the accelerator pedal, brake pedal and/or clutch pedal are used as input means for the virtual reality application. In such a case, the steering wheel and the pedals are decoupled from the motor vehicle and do not engage in the movement of the motor vehicle in the form of control commands and the like.

Finally, the aim is achieved by a seating apparatus of a motor vehicle which is operable by a method having at least one of the above-mentioned features, and which comprises at least one seating unit, which comprises at least one drive for moving, in particular rotating about at least one axis, the seating unit, and the at least one control device, which is functionally assignable or assigned to a sensor unit of the motor vehicle, wherein the seating apparatus is connectable or connected to at least one virtual reality application comprising at least one processing unit.

Further features, details and advantages of the invention result from disclosure and, from the illustration in the drawings and the following description of a preferred embodiment of the method and the seating apparatus.

BRIEF DESCRIPTION OF THE DRAWINGS

In the figures.

DETAILED DESCRIPTION

Figure 1:
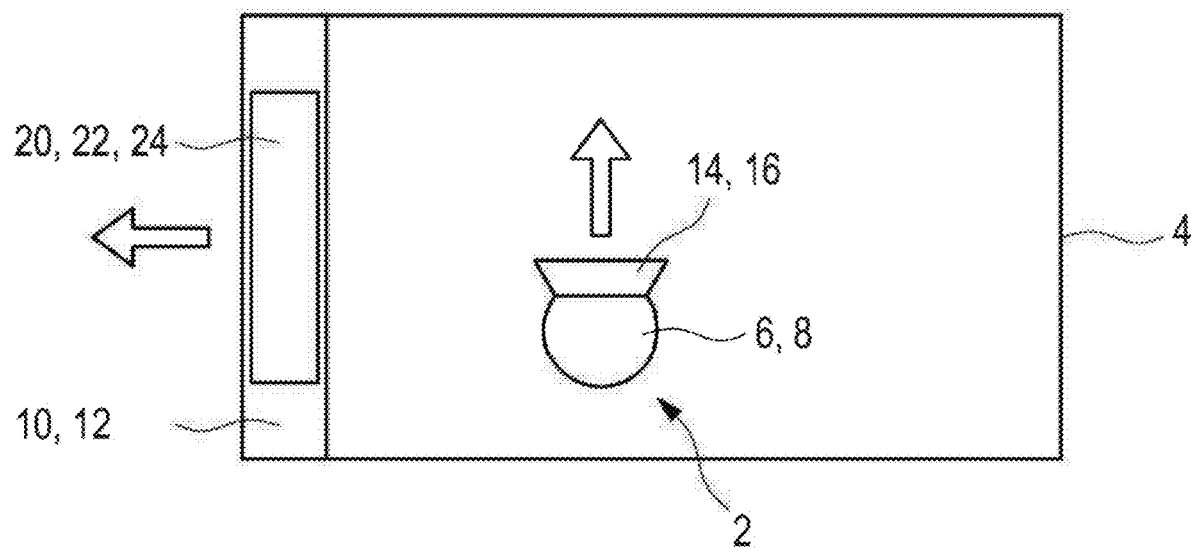
FIG. 1 shows a schematic top view of a motor vehicle having a seating apparatus.

FIG. 1 shows a schematic representation of a seating apparatus, provided as a whole with the reference sign 2, of a motor vehicle 4. The seating apparatus 2 comprises a seating unit 6 and a drive 8 for moving the seating unit 6. In addition, the seating apparatus 2 of the motor vehicle 4 comprises a control device 10, which is functionally assigned a sensor unit 12 of the motor vehicle 4. In addition, the seating apparatus 2 of the motor vehicle 4 is connected to a virtual reality application 14, which in turn comprises at least one processing unit 16.

Figure 2:
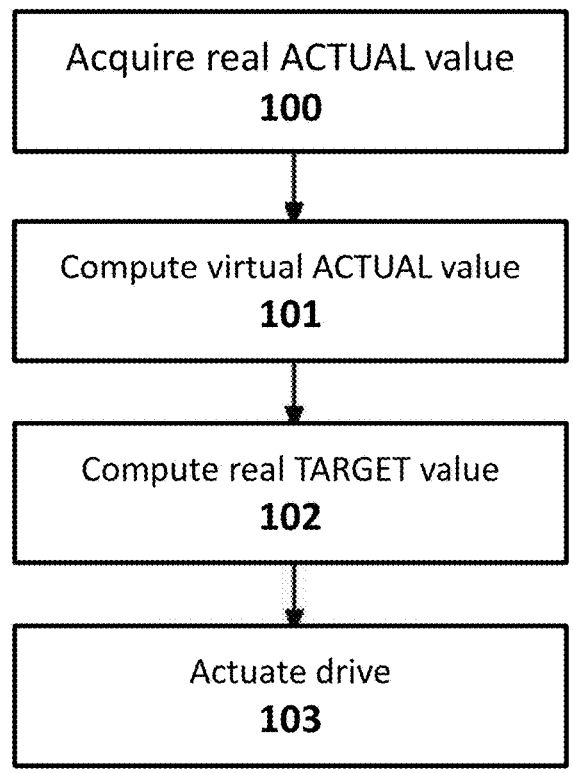
FIG. 2 shows a schematic flow chart of a method for operating a seating apparatus.

The seating apparatus 2 according to FIG. 1 is described in greater detail below by a method for operating the seating apparatus 2 in a schematic flow chart according to FIG. 2.

In a first step 100, a real ACTUAL value of a movement or acceleration of the motor vehicle 4 is acquired by a sensor unit 12 functionally assigned to the control device 10 and relayed to the control device 10.

The at least one real ACTUAL value of the movement or the acceleration of the motor vehicle 4 can be acquired, for example, by a first sensor means 20 of the control device 10. This first sensor means 20 can comprise, for example, a movement or acceleration sensor, a compass and/or a gyroscope.

In addition, the acquisition of the at least one real ACTUAL value of the movement or acceleration of the motor vehicle 4 can comprise an acquisition of the location, orientation and movement or acceleration direction of the motor vehicle 4 by means of a navigation means 22, such as Global Positioning System (GPS) or radar. Both the data of the first sensor means 20 and also the data of the navigation means 22 can be relayed to the control device 10.

In a subsequent step 101, a virtual ACTUAL value of a movement or acceleration within the virtual reality application 14 is acquired or computed by the processing unit 16 and relayed to the control device 10. In this case, the location and the orientation of the virtual reality application 14 can additionally be acquired by a second sensor means 24 of the sensor unit 12.

In a subsequent step 102, a real TARGET value of a correction movement or correction acceleration by the seating unit 6 is computed inside the control device 10. This TARGET value is dependent on the real ACTUAL value of the movement or acceleration of the motor vehicle 4 in such a way that the superposition of correction movement or correction acceleration by the seating unit 6 and the movement or acceleration of the motor vehicle 4 corresponds substantially in magnitude and direction to the virtual ACTUAL value of the movement or acceleration within the virtual reality application 14.

In a subsequent step 103, the drive 8 of the seating unit 6 is actuated by the TARGET value. This is performed by the control device 10 to execute the correction movement or correction acceleration by way of the seating unit 6.

The correction movement or correction acceleration by the seating unit 4 can be performed by rotation about a vertical, transverse and/or longitudinal axis of the motor vehicle 4 or by a movement of the seating unit 6 along the vertical, transverse and/or longitudinal axis of the motor vehicle 4.

The virtual ACTUAL values of the movement or acceleration within the virtual reality application 14 can be relayed to the control device 10 by means of a cable connection or via radio.

The features of the invention disclosed in the above description, the claims and the drawing can be essential to the implementation of the invention in its various embodiments both individually and also in any desired combination.

The invention claimed is:

1. A method for operating a seating apparatus of a motor vehicle during operation of a virtual reality application by a user located in the motor vehicle, wherein the seating apparatus comprises at least one seating unit, at least one drive for moving the seating unit, and at least one control device, which is functionally assignable or assigned a sensor unit of the motor vehicle, and wherein the seating apparatus is connected to the virtual reality application, which comprises at least one processing unit, comprising the following steps:
   a. acquiring at least one real ACTUAL value of at least one movement or acceleration of the motor vehicle by way of the sensor unit functionally assigned to the control device and relaying the real ACTUAL value of the movement or acceleration of the vehicle to the control device;
   b. acquiring and/or computing a simulated virtual ACTUAL value of at least one movement or acceleration within the virtual reality application by way of the processing unit and relaying the virtual ACTUAL value of the movement or acceleration within the virtual reality application to the control device;
   c. computing a real TARGET value of a correction movement or correction acceleration by way of the seating unit according to the real ACTUAL value of the movement or acceleration of the motor vehicle in such a way that the superposition of a combined: (1) correction movement or correction acceleration by the seating unit and (2) movement or acceleration of the motor vehicle corresponds substantially in magnitude and direction to the virtual ACTUAL value of the movement or acceleration within the virtual reality application; and
   d. actuating the drive of the seating unit by way of the control device according to at least the real TARGET value to execute the correction movement or correction acceleration by way of the seating unit.

2. The method according to claim 1, wherein the at least one real ACTUAL value of the movement or acceleration of the motor vehicle is acquired by the sensor unit functionally assigned to the control device by a first sensor means of the sensor unit.

3. The method according to claim 2, wherein the acquisition of the at least one real ACTUAL value of the movement or acceleration of the motor vehicle comprises an acquisition of the location, orientation and movement direction and/or acceleration direction of the motor vehicle by a navigation means.

4. The method according to claim 2, further comprising an acquisition of the location and orientation of the virtual reality application by a second sensor means of the sensor unit and/or the virtual reality application.

5. The method according to claim 2, wherein the virtual ACTUAL value of the movement or acceleration within the virtual reality application is relayed to the control device by a cable connection between the processing unit and the control device and/or wirelessly.

6. The method according to claim 2, wherein the correction movement or correction acceleration by the seating unit comprises a rotation about a vertical, transverse and/or longitudinal axis of the motor vehicle, and/or in that the correction movement or acceleration by the seating unit comprises a movement of the seating unit along the vertical, transverse and/or longitudinal axis of the motor vehicle.

7. The method according to claim 2, further comprising transferring the seating unit into a location and orientation in which a viewing direction of the virtual reality application corresponds to a movement direction of the motor vehicle.

8. The method according to claim 1, wherein the acquisition of the at least one real ACTUAL value of the movement or acceleration of the motor vehicle comprises an acquisition of the location, orientation and movement direction and/or acceleration direction of the motor vehicle by a navigation means.

9. The method according to claim 8, further comprising an acquisition of the location and orientation of the virtual reality application by a second sensor means of the sensor unit and/or the virtual reality application.

10. The method according to claim 8, wherein the virtual ACTUAL value of the movement or acceleration within the virtual reality application is relayed to the control device by a cable connection between the processing unit and the control device and/or wirelessly.

11. The method according to claim 8, wherein the correction movement or correction acceleration by the seating unit comprises a rotation about a vertical, transverse and/or longitudinal axis of the motor vehicle, and/or in that the correction movement or acceleration by the seating unit comprises a movement of the seating unit along the vertical, transverse and/or longitudinal axis of the motor vehicle.

12. The method according to claim 1, further comprising an acquisition of the location and orientation of the virtual reality application by a second sensor means of the sensor unit and/or the virtual reality application.

13. The method according to claim 12, wherein the virtual ACTUAL value of the movement or acceleration within the virtual reality application is relayed to the control device by a cable connection between the processing unit and the control device and/or wirelessly.

14. The method according to claim 12, wherein the correction movement or correction acceleration by the seating unit comprises a rotation about a vertical, transverse and/or longitudinal axis of the motor vehicle, and/or in that the correction movement or acceleration by the seating unit comprises a movement of the seating unit along the vertical, transverse and/or longitudinal axis of the motor vehicle.

15. The method according to claim 1, wherein the virtual ACTUAL value of the movement or acceleration within the virtual reality application is relayed to the control device by a cable connection between the processing unit and the control device and/or wirelessly.

16. The method according to claim 15, wherein the correction movement or correction acceleration by the seating unit comprises a rotation about a vertical, transverse and/or longitudinal axis of the motor vehicle, and/or in that the correction movement or acceleration by the seating unit comprises a movement of the seating unit along the vertical, transverse and/or longitudinal axis of the motor vehicle.

17. The method according to claim 1, wherein the correction movement or correction acceleration by the seating unit comprises a rotation about a vertical, transverse and/or longitudinal axis of the motor vehicle, and/or in that the correction movement or acceleration by the seating unit comprises a movement of the seating unit along the vertical, transverse and/or longitudinal axis of the motor vehicle.

18. The method according to claim 1, further comprising transferring the seating unit into a location and orientation in which a viewing direction of the virtual reality application corresponds to a movement direction of the motor vehicle.

19. The method according to claim 1, further comprising actuating the virtual reality application by way of at least one input means.

20. A seating apparatus of a motor vehicle which comprises at least one seating unit, at least one drive for moving the seating unit, and at least one control device, which is functionally assignable or assigned a sensor unit of the motor vehicle,
   wherein the seating apparatus is connected to at least one virtual reality application which comprises at least one processing unit
   wherein the seating unit is operated during operation of the at least one virtual reality application by a user located in the motor vehicle,
   wherein the drive of the seating unit is activated by way of the control device according to at least a real TARGET value to execute a correction movement or correction acceleration by way of the seating unit,
   wherein the real TARGET value of the correction movement or correction acceleration is computed by way of the seating unit according to a real ACTUAL value of a movement or acceleration of the motor vehicle in such a way that the superposition of a combined: (1) correction movement or correction acceleration by the seating unit and (2) movement or acceleration of the motor vehicle corresponds substantially in magnitude and direction to the a virtual ACTUAL value of the movement or acceleration within the virtual reality application,
   wherein the real ACTUAL value of at least one movement or acceleration of the motor vehicle is acquired by way of the sensor unit, which is functionally assigned to the control device, and the real ACTUAL value of the movement or acceleration of the vehicle is relayed to the control device,
   wherein the virtual ACTUAL value of the movement or acceleration within the virtual reality application is acquired or computed by way of the processing unit and the virtual ACTUAL value of the movement or acceleration within the virtual reality application is relayed to the control device.

* * * * *